United States Patent [19]

Nakamura et al.

[11] Patent Number: 4,916,644
[45] Date of Patent: Apr. 10, 1990

[54] RUNNING SPEED DETECTING DEVICE FOR MARINE VESSELS

[75] Inventors: Tomoji Nakamura; Ryoji Sawada, both of Iwata; Kazuhiro Nakamura; Tatsuya Yoshioka, both of Hamamatsu, all of Japan

[73] Assignee: Sanshin Kogyo Kabushiki Kaisha, Hamamatsu, Japan

[21] Appl. No.: 164,513

[22] Filed: Mar. 7, 1988

[30] Foreign Application Priority Data

Mar. 6, 1987 [JP] Japan .................................. 62-50307
Oct. 15, 1987 [JP] Japan ................................ 62-260122

[51] Int. Cl.$^4$ ......................... G01P 5/14; G06F 15/20
[52] U.S. Cl. ...................................... 364/565; 73/182
[58] Field of Search ............... 364/565, 551, 558, 566; 73/182, 861.65

[56] References Cited

U.S. PATENT DOCUMENTS

| | | |
|---|---|---|
| 3,875,388 | 4/1975 | Luten et al. ........................... 364/565 |
| 3,881,094 | 4/1975 | Taylor et al. ......................... 364/565 |
| 4,041,293 | 8/1977 | Kihlberg ............................. 364/565 |
| 4,068,207 | 1/1978 | Andermo et al. ..................... 364/565 |
| 4,071,898 | 1/1978 | Schorsch et al. ..................... 364/565 |
| 4,094,193 | 6/1978 | Gerlach ................................ 364/565 |
| 4,205,552 | 6/1980 | Refoy ..................................... 73/182 |
| 4,244,026 | 1/1981 | Dickey, Jr. .......................... 364/565 |
| 4,248,085 | 2/1981 | Coulthard ............................ 364/565 |
| 4,409,827 | 10/1983 | Overs ..................................... 364/565 |
| 4,622,850 | 11/1986 | Gaffrig .................................... 73/182 |
| 4,759,216 | 7/1988 | Carpenter et al. .................... 73/182 |

FOREIGN PATENT DOCUMENTS 1523200 4/1969 Fed. Rep. of Germany ........ 73/182

Primary Examiner—Felix D. Gruber
Attorney, Agent, or Firm—Ernest A. Beutler

[57] ABSTRACT

A watercraft speed sensor that drives a speed signal from water pressure generated by the movement of the watercraft through the water. Several embodiments of arrangements are disclosed for obtaining an ambient reference signal which is subtracted from the measured pressure signal in order to obtain a greater degree of accuracy for changes in atmospheric conditions.

10 Claims, 5 Drawing Sheets

4,916,644

RUNNING SPEED DETECTING DEVICE FOR MARINE VESSELS

BACKGROUND OF THE INVENTION

This invention relates to a running speed detecting device for marine vessels and more particularly to an improved, simplified and highly accurate device for detecting the speed of a marine vessel.

There are a number of types of speed indicators employed for watercraft. These devices all operate on electrical principles and include either the propeller type wherein a propeller is mounted on the hull and rotates at a speed which will be related to the speed of the hull or of the magnetic current meter type. Such magnetic current meter type devices also are provided on the exterior of the hull and each system requires the provision of connecting wires for transmitting a signal from the sensor to a remotely positioned indicator. However, the accuracy of such devices depends on the effectiveness of the transmission of the electrical signal from the remotely positioned speed transducer to the speed indicator positioned in proximity to the watercraft operator. As a result, these devices tend to be inaccurate.

In order to improve the accuracy of watercraft speed indicators and in order to permit a device that can be used with a wide variety of watercraft, it has been proposed to utilize the water pressure as an indicator of speed. To this end, the hull is provided with a forwardly facing opening that receives the water pressure which will be dependent upon the speed of watercraft travel. A conduit then conveys the water pressure from the opening to a remotely positioned speed indicating device that incorporates a pressure transducer that outputs a signal indicative of water pressure. A converter circuit then converts this water pressure signal into a speed signal. An arrangement of this type is shown in the copending application entitled "Speedometer For Marine Vessels," Ser. No. 160,124, filed Feb. 25, 1988 in the name of Kazuhior Nakahama et al, which application is assigned to the assignees of this application.

Although the arrangement shown in the aforenoted copending application is extremely effective, it should be understood that atmospheric pressure and water pressure can vary and as such these variations will affect the accuracy of the speed signal.

It is, therefore, a principal object of this invention to provide an arrangement for sensing watercraft speed through sensing of the pressure of the water as the watercraft moves and adjusting the signal in response to ambient or base line conditions.

SUMMARY OF THE INVENTION

This invention is adapted to be embodied in a running speed detecting device for marine vessels comprising a member defining a forwardly facing opening that is submerged in the body of water in which the watercraft is operating during watercraft operation. Conduit means convey pressure from this opening to a pressure transducer that converts a pressure signal into an electrical output signal. Computing means convert the output signal of the pressure transducing device into a speed signal and display that speed signal. In accordance with the invention, means are incorporated for providing a reference signal and that signal is subtracted from the pressure signal by the computing means to provide an accurate speed signal.

DETAILED DESCRIPTION OF THE PREFERRED EMBODIMENTS

Figure 1:
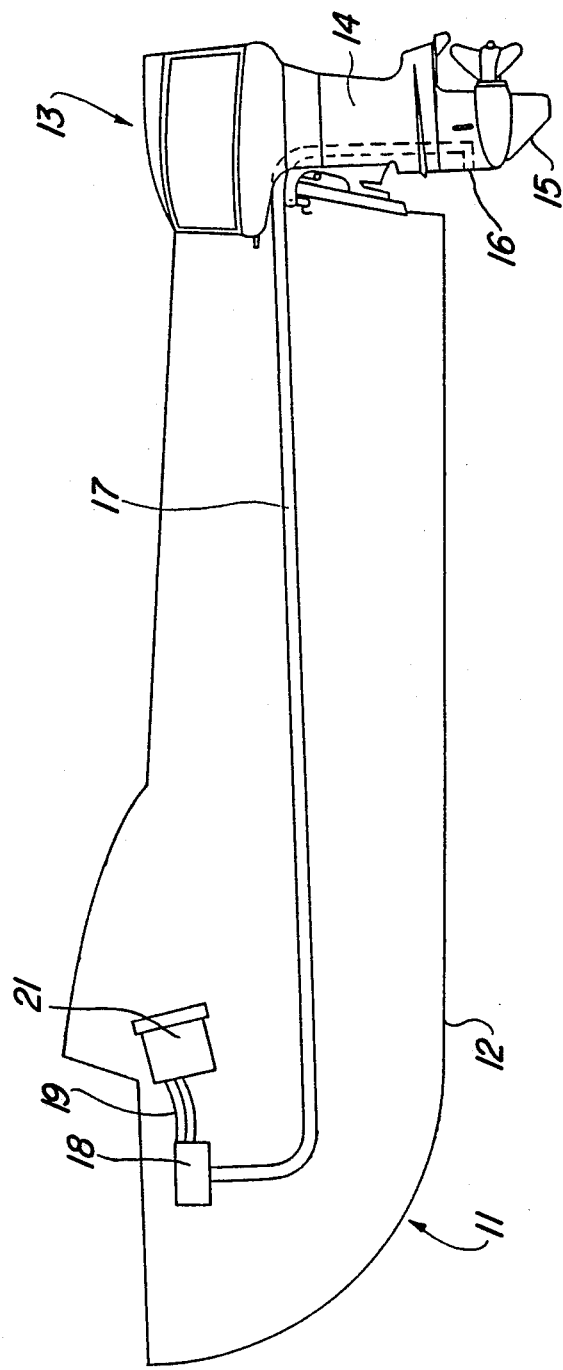
FIG. 1 is a side elevational view of a watercraft constructed in accordance with an embodiment of the invention.

Referring to FIG. 1, a watercraft in accordance with an embodiment of the invention is identified generally by the reference numeral 11. The watercraft 11 is comprised of a hull indicated generally by the reference numeral 12 and which is propelled an outboard motor, indicated by reference numeral 13. The outboard motor 13 includes a drive shaft housing 14 which has a lower unit 15 in which a forwardly facing opening 16 is formed.

A conduit 17 is provided for transmitting a water pressure signal from the opening 16 to a pressure transducer 18. The pressure transducer 18 outputs a voltage through conductors 19 to a combined converter, computer and speed indicator mechanism, indicated generally by the reference numeral 21. The speed indicator 21 is positioned in the passenger cabin of the watercraft 11 in proximity to the operator for indicating watercraft speed to the operator.

Figure 2:
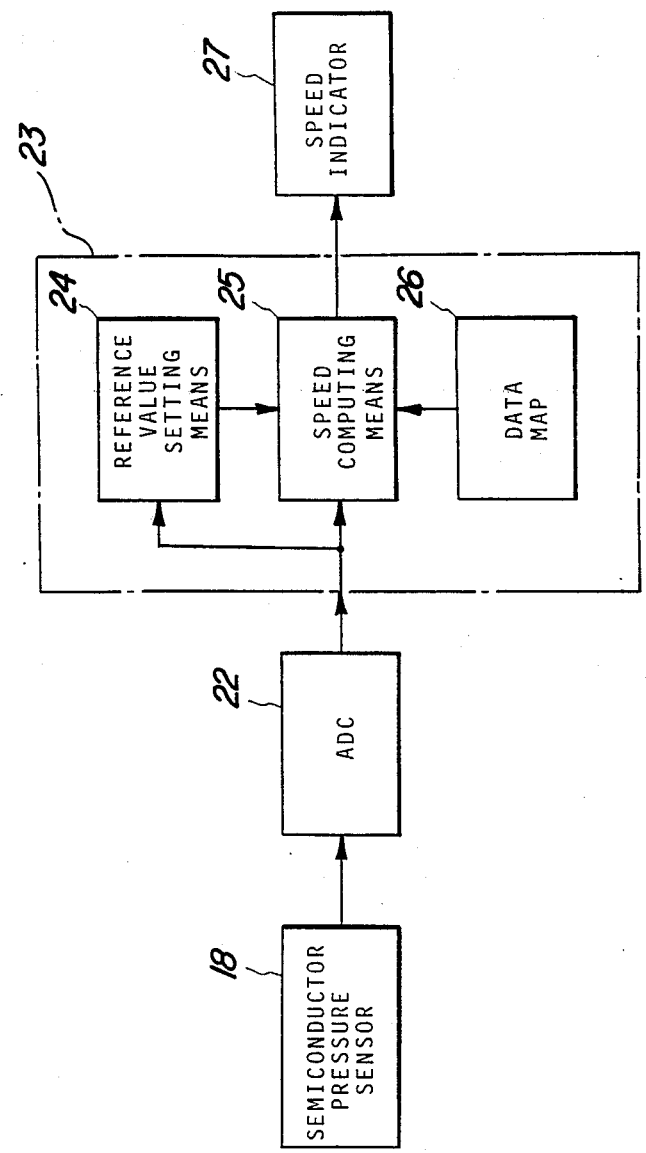
FIG. 2 is a block diagram showing the construction of the pressure transducer and its relationship to the speed indicator of this embodiment.

The construction as thus far described is generally the same as that shown in aforenoted copending application Ser. No. 160,124, the disclosure of which is herein incorporated by reference. Since the invention in this application deals with the method and operation of the converter, computer and speed indicator mechanism 21 only that portion of the invention will be described in detail by particular reference to FIG. 2. The semiconductor pressure sensor, transducer 18 outputs a voltage indicative of pressure to an analogue to digital converter 22. The analogue to digital computer in turn outputs a digital signal indicative of pressure to a microcomputer 23. The microcomputer 23 includes a reference value setting device 24, a speed computing means 25 and a data map 26. The speed computing means 25 outputs a signal indicative of speed, which is computed by subtracting the reference pressure from the sensed pressure and then outputting a signal to the indicator of speed as determined by the map 26 which contains a plot of pressure to speed. This output signal is transmitted to an indicator 27 which may be of any known type either digital or analogue.

Figure 3:
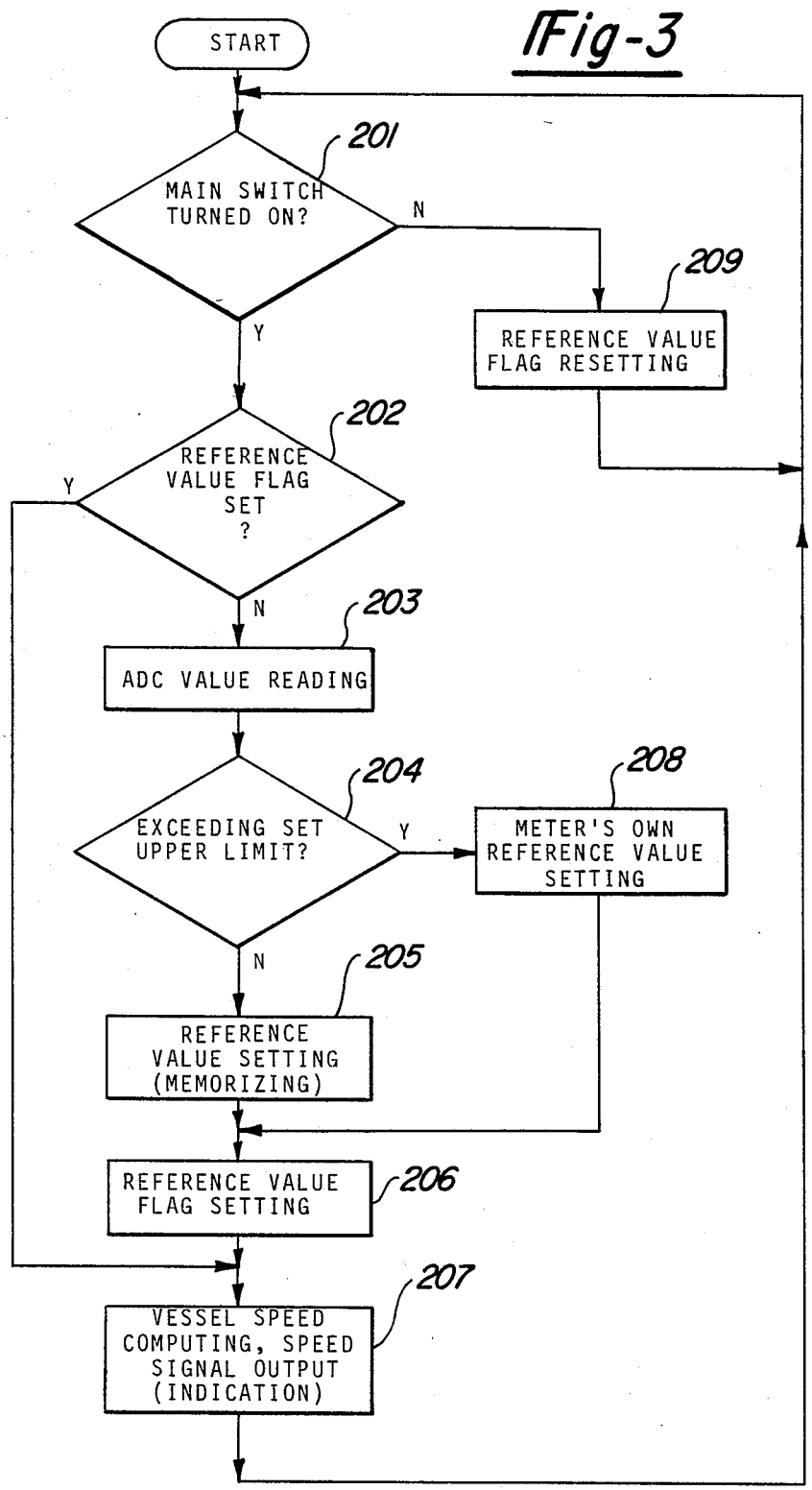
FIG. 3 is a block diagram showing how the computer operates in accordance with one embodiment of the invention.

FIG. 3 shows one routine by which the minicomputer 23 may operate in order to establish the reference value which is subtracted from the sensed value in order to obtain the accurate speed value. Basically, the way this routine operates is that the reference value is set when the main ignition switch is turned on. Referring to this Figure, when the program is started at the step 201 there is a determination made as to whether or not the main ignition switch is turned on. If it has not been turned on, or when the main ignition switch is turned off, the program moves to the step 209 to reset the reference value flag. If, however, the main ignition switch is turned on, the program moves to the step 202 to determine if the reference value flag has been set. If it has not been set, the output of the analogue to digital computer 22 is read at the step 203. Then at the step 204 it is determined if the read reference value exceeds a predetermined upper limit. This upper limit may be a limit which is set high enough so as to indicate that the watercraft may in fact be in motion and hence the reading at that time would not be an indication of the atmospheric and water pressure conditions at standstill.

If, however, it is determined at the step 204 that the upper limit has not been exceeded, the program memorizes the reference value at the step 205 and then at the step 206 sets the reference value flag. Vehicle speed is then computed at the step 207 by subtracting the reference value from the measured value to obtain an accurate speed signal.

If at the step 204 it is determined that the upper limit has been exceeded, the program moves to the step 208 wherein a reference value is set by a reference value which is internally contained within the meter. The program then moves to the step 206 to set the reference value flag and to the step 207 to compute vehicle speed by subtracting the meter's own reference value from the measured value.

Figure 4:
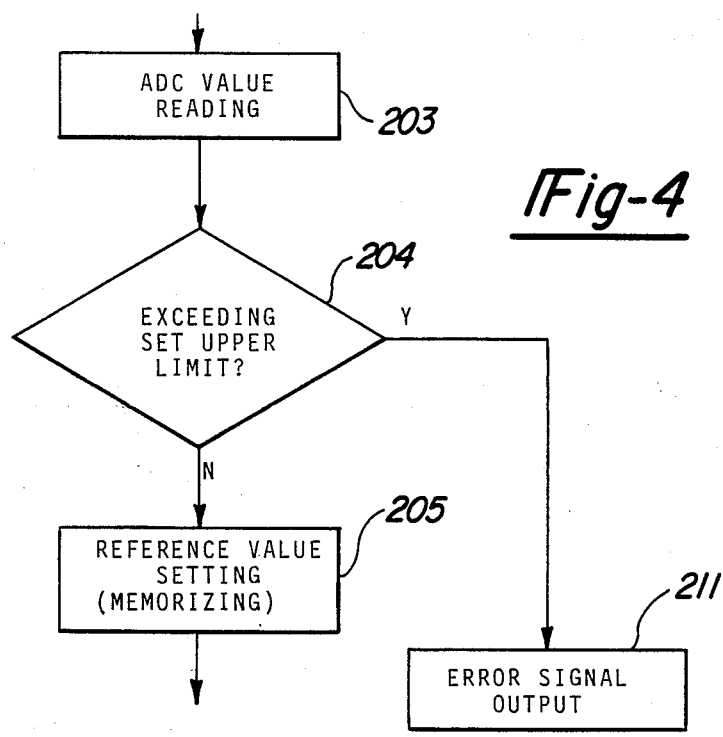
FIG. 4 is a partial block diagram, in part similar to FIG. 3, showing another embodiment.

FIG. 4 shows another routine wherein the meter does not have its own reference value. If this is the case, and the program decides at the step 204 that the upper limit is exceeded, there is output at the step 211 an error signal which will warn the operator that the speed indicated by the speed indicator 27 may not be accurate due to the lack of setting of a reference value.

Figure 5:
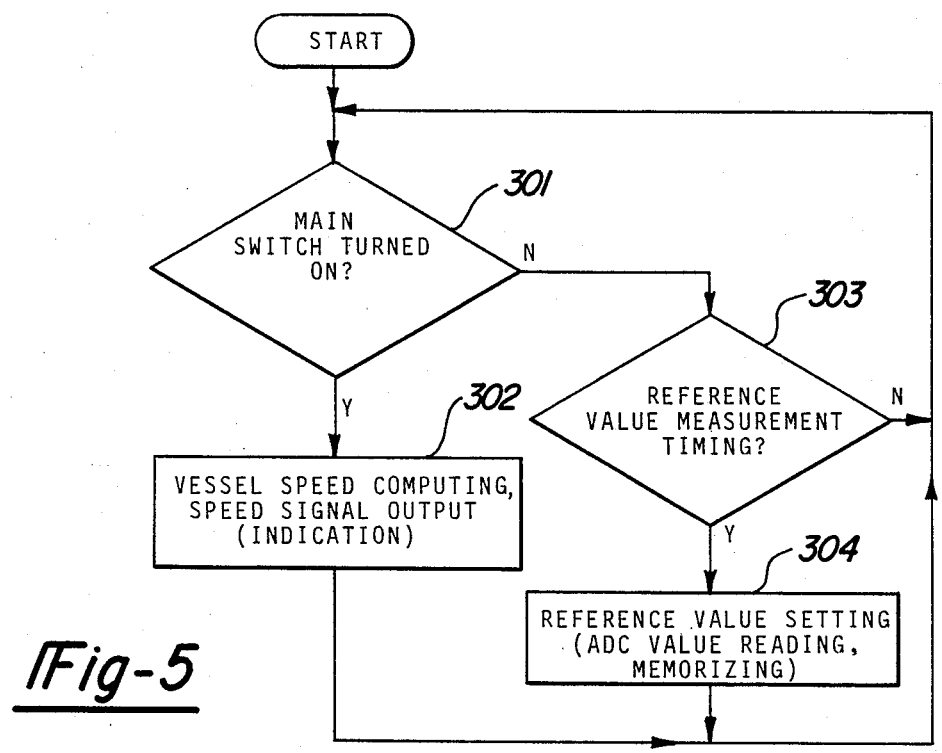
FIG. 5 is a block diagram showing another embodiment of the invention.

FIG. 5 shows another routine under which the minicomputer 203 may operate if suitably programmed. In this routine, a set reference value is obtained when the main ignition switch is turned off. This reference value is then memorized and utilized as the reference value indicative of atmospheric and water pressure conditions at standstill.

Referring to FIG. 5, when the program starts there is a determination by the computer made at the step 301 as to whether or not the main ignition switch is turned on. When the switch is turned on, vehicle speed is computed at the step 302 in the manner previously described. However, when the main ignition switch is turned off, the program moves to the step 303 so as to determine if the reference value measurement timing program is in motion or whether the time has run out. If the time has run out, there is taken a reference value setting at the step 304 which is memorized. The timing of the settings may be varied and by taking a number of successive reference values which are set, the program will always be updated to current conditions so that when the main ignition switch is turned on not too long a time will have elapsed between when the last reference value was measured.

Figure 6:
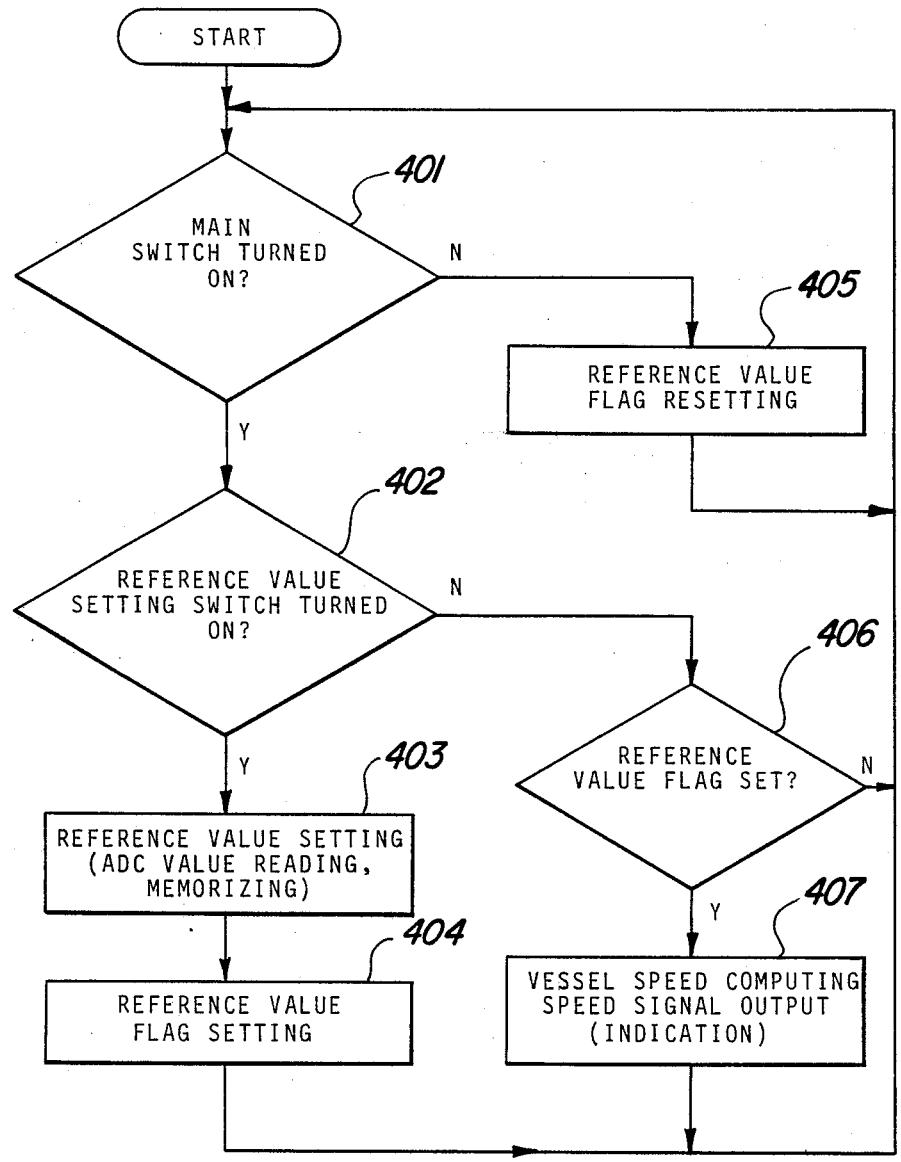
FIG. 6 is a block diagram showing a further embodiment of the invention.

FIG. 6 shows another program wherein the operator may operate a reference value switch so as to make his determination as to when the reference value will be taken. Referring to this Figure, when the program begins there is first made a determination at the step 401 as to whether or not the main ignition switch is turned on. If the main ignition switch is turned on, the program moves to the step 402 to determine if the reference value setting switch is turned on. If the operator has turned this reference value switch on, the program then moves to the step 403 so as to take and memorize a reference value from the output of the analogue to digital converter 22. The reference value flag is then set at the step 404 and the program returns back to step 401.

When the program returns back to the step 401 and the main ignition switch is still turned on, it will be determined at the step 402 that the reference value setting switch is not turned on and the program will move to the step 406 to determine if the reference value flag has been set. If it has been set, the program moves to the step 407 so as to compute watercraft speed by subtracting the reference value from the output of the analogue to digital computer as aforedescribed.

In this program when the main ignition switch is turned off, the program moves to the step 405 so as to reset the reference value flag.

It should be readily apparent from the foregoing description that a number of embodiments of the invention have been illustrated and described and each of which permits the obtaining of a very accurate watercraft speed by subtracting ambient conditions from the pressure sensed at the opening 16. Although a number of embodiments of the invention have been illustrated and described, various changes and modifications may be made without departing from the spirit and scope of the invention as defined by the appended claims.

We claim:

1. A water speed indicator for a watercraft comprised of a hull, means carried by said hull for defining an opening to receive water pressure generated by the movement of said hull through the water, conduit means for transmitting said water pressure from said opening to a transducer for providing an output signal, means for obtaining a reference signal indicative of ambient conditions from said output signal, means for subtracting said reference signal from said output signal to obtain a correct signal, means for converting said correct signal into a velocity signal, and means for displaying water velocity in response to said velocity signal.

2. A water speed indicator for a watercraft as set forth in claim 1 wherein the reference signal is obtained by sensing the ambient pressure at the opening.

3. A water speed indicator for a watercraft as set forth in claim 1 wherein the reference signal is generated when a switch is turned on.

4. A water speed indicator for a watercraft as set forth in claim 3 wherein the switch is a main power switch.

5. A water speed indicator for a watercraft as set forth in claim 4 wherein the reference signal is obtained by sensing the ambient pressure at the opening.

6. A water speed indicator for a watercraft as set forth in claim 3 wherein the switch comprises a reference value setting switch.

7. A water speed indicator for a watercraft as set forth in claim 6 wherein the reference signal is obtained by sensing the ambient pressure at the opening.

8. A water speed indicator for a watercraft as set forth in claim 1 wherein the reference signal is obtained when a main switch is turned off.

9. A water speed indicator for a watercraft as set forth in claim 8 wherein the reference signal is obtained by sensing the ambient pressure at the opening.

10. A water speed indicator for a watercraft as set forth in claim 8 wherein a reference signal is obtained periodically at set periods after the main switch has been turned off with successive readings being effective to replace earlier readings.

* * * * *